UNITED STATES PATENT OFFICE.

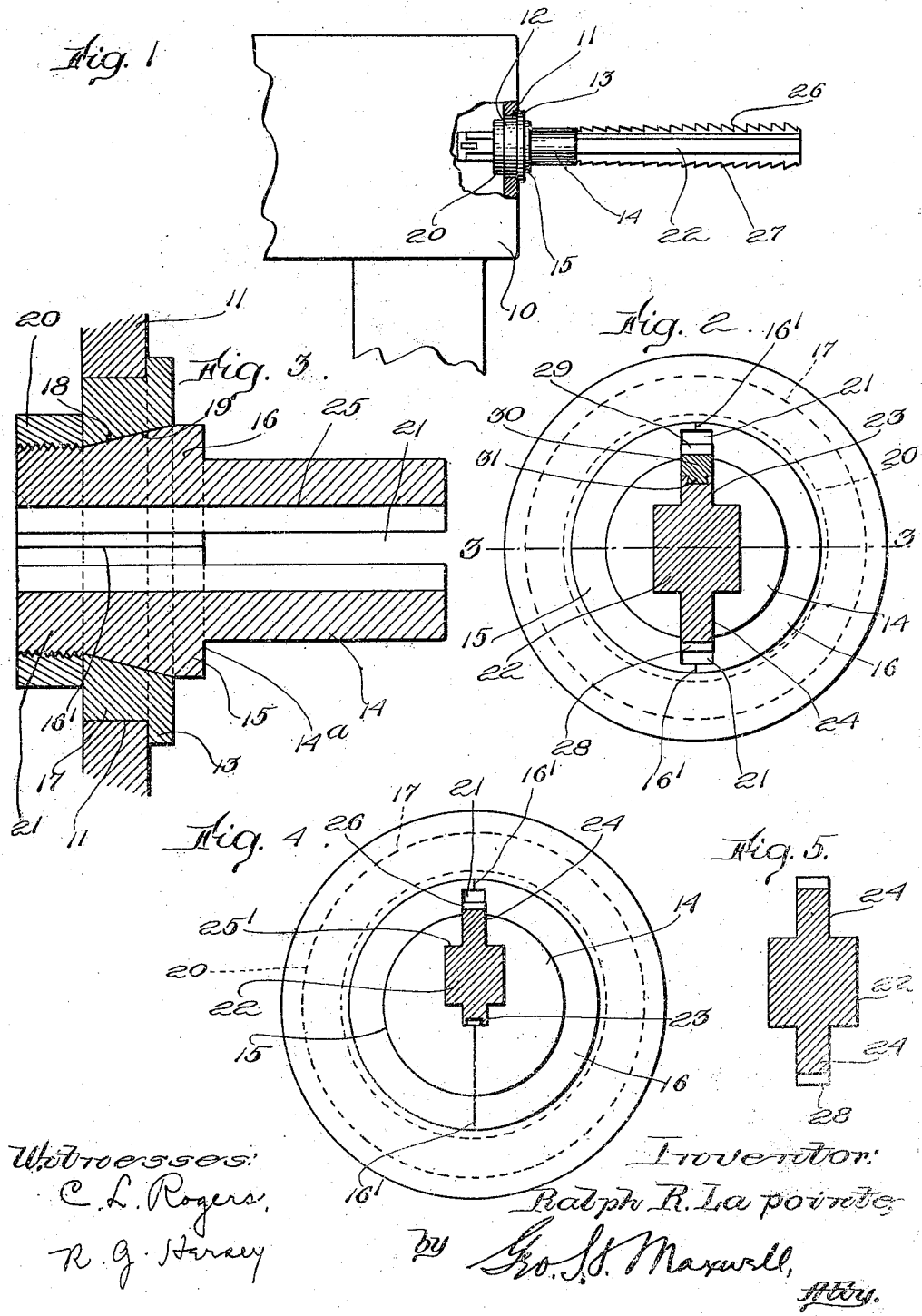

RALPH R. LAPOINTE, OF HUDSON, MASSACHUSETTS, ASSIGNOR, BY MESNE ASSIGNMENTS, TO LAPOINTE MACHINE TOOL CO., OF HUDSON, MASSACHUSETTS, A CORPORATION OF MAINE.

BROACHING MECHANISM.

1,028,824.   Specification of Letters Patent.   Patented June 4, 1912.

Application filed October 4, 1911. Serial No. 652,880.

*To all whom it may concern:*

Be it known that I, RALPH R. LAPOINTE, a citizen of the United States, and resident of Hudson, county of Middlesex, Commonwealth of Massachusetts, have invented an Improvement in Broaching Mechanism, of which the following description, in connection with the accompanying drawings, is a specification, like letters on the drawings representing like parts.

This invention relates to broaching mechanism, and while having other and more general fields of usefulness, is especially adapted for the broaching out of key ways in the shaft holes of pulleys, gears, and other wheels.

The invention provides an improved broach and a novel form of guide sleeve therefor and work supporting arbor whereby the broach is closely and accurately guided in its slide ways with a virutal elimination of all chattering or back lash.

The improved form of broach is designed to enable the cutting of opposite key ways in the work when desired, the broach in this operation being balanced as to the thrusts imparted by the opposite cutting ribs so that frictional resistance and wear is minimized.

The invention further has to do with a novel form of guide sleeve for the broach and work arbor which can be easily and cheaply manufactured, and assembled in the machine or taken apart as required very readily, and without disturbance of other parts.

The invention will be better understood from the following detailed description, taken in connection with the accompanying drawings, and will be thereafter pointed out in the appended claims.

Referring to the drawings, Figure 1 is a side elevation showing the improved mechanism set in place in a broaching machine head, a portion of such head being shown conventionally. Fig. 2 is a transverse section through the broach, the built up guide sleeve being shown in end elevation. Fig. 3 is a section on line 3—3 of Fig. 2 with the broach removed. Fig. 4 is a view similar to Fig. 2, showing a modified form of the invention, and Fig. 5 is a transverse section showing the broach as integral.

The head of the broaching machine is shown conventionally at 10 with the usual circular aperture 11 in its end to receive the sleeve arbor for guiding the broach and supporting the work. This sleeve arbor has a cylindrical portion 12 adapted to fit the opening 11 in the machine head with a flange 13 adapted to bear thereagainst to resist the cutting thrusts, and an arbor 14 over which the pulley, or other wheel to be operated on, is fitted, this arbor having a suitable backing shoulder 14$^a$ to serve as a backing abutment for the work. The sleeve arbor 12 in the present instance is built up of assembled parts, the sleeve proper which guides the broach being formed in two halves 15, 16 with the line of division indicated at 16'. The sections of this sleeve are drawn and held rigidly together by a heavy integral ring 17 having a conical aperture 18 therethrough adapted to engage a conical formation 19 on the sleeve sections and the parts being rigidly fixed together by a thimble 20 threaded over projecting ends 21 of the sleeve sections and engaging against the ring 17. The ring 17 carries the cylindrical portion 12, before referred to, and fitting into the aperture of the machine head and also the flange 13 for engagement with the end of said head. As seen in Figs. 1, 2, and 3 the apparatus is adapted for simultaneously cutting opposite key ways in the work, and the work receiving arbor 14 is hence slotted at opposite sides as seen at 21 to guide the double ribbed broach and permit the projection of its cutting portions therefrom.

An important feature of the invention has to do with the improved broach and this consists in a body portion 22 of rectangular form and relatively heavy stock with ribs 23, 24 projecting oppositely therefrom. The body portion of the broach is closely guided in a way 25 of corresponding section in the sleeve arbor and the ribs 23, 24 likewise closely fit the slots 21 so as to be accurately guided therein. When it is desired to cut opposite key ways, both these opposite ribs extend out with tapered cutting serrations as seen at 26, 27, but when only one key way is desired, one of the ribs, as 23, only extends a short distance out from the body of the broach so as to perform its guiding and alining function by engagement with the walls of its slot 21.

In Figs. 1 and 2 the broach is shown with a construction permitting a second cutting portion to be applied or not as desired. In this form the rib 24 has its teeth 28 formed integral therewith, but the teeth 29 at the opposite side are formed on a separate bar or slab 30, having a suitable interlocking engagement with the rib 23 as shown at 31. Thus the bar 30 with its line of teeth may be quickly applied when it is desired to cut opposite key ways and as quickly removed when only one key way is to be formed, rib 23 then serving merely as a guiding and alining device without extending out to the circumference of the arbor 14.

In the form of the invention shown in Fig. 4 the broach is mounted eccentrically, the guide way 25' for the body 22 of the broach being to one side of the center of the arbor 14 so that while the teeth of the rib 24 extend outward beyond the circumference of the arbor 14, the opposite rib 23 is only adapted for its guiding function. In the case of broaches designed for use with this form of the invention only, of course any special formation of the rib 23 to receive a cutter bar is unnecessary and may be omitted. In the form of the invention shown in Fig. 5 both of the opposite ribs carry cutting teeth integral with the rib, this form being preferable where only opposite key ways are to be formed, while the form of Fig. 2 is especially adapted for use where different sizes of work are frequently encountered and where it is desired to dispense with the necessity for changing broaches. The broach may be operated in any usual or desired manner being shown as connected to screw 32 for reciprocation, the construction of the operating mechanism or of the machine support forming no part of the present invention.

The sleeve arbor thus formed can be quickly and easily assembled in place in the machine, or taken apart as required, and when assembled is practically as rigid as an integral structure. A further advantage of this form is that the sectional construction of the broach guiding portions enables the parts to be machined and finished more readily than is the case with an integral sleeve. The broach with a body of rectangular form and oppositely extending ribs is adapted to be closely guided in the way 25 and the slots 21 so that key ways may be very accurately produced and in the case of the double sided broach the cutting thrusts from the opposite ribs are substantially balanced so that there is practically no frictional resistance and very little wear on the bearing surfaces.

By reason of the laterally extending guide ledges which are afforded by the enlarged body of the broach, it is held up and accurately guided on the return stroke so that the teeth do not drag over the work. This is a feature of importance, since the dragging of the teeth on the return would not only be apt to mar the work, but would unnecessarily wear the teeth themselves.

Having described my invention, what I claim as new, and desire to secure by Letters Patent is:

1. An apparatus of the kind described, comprising a sleeve arbor for guiding a broach and supporting the work thereon, said arbor being formed of plural sections, and means for rigidly clamping said sections in assembled relation, said means having a portion adapted to fit a broaching machine head.

2. An apparatus of the kind described, comprising a sleeve arbor formed in plural sections with a lengthwise extending guideway therein for a broach, said arbor having a shoulder to serve as a work abutment, and means coöperative with a portion of the arbor at the rear of said shoulder for clamping the sections thereof rigidly together in assembled relation.

3. An apparatus of the kind described, comprising a sleeve arbor having a lengthwise extending guide way therethrough for a broach, a slotted work holding portion at its front end, and a shoulder to serve as a work abutment with a conical formation at the rear of said shoulder, and a ring having a tapered opening therethrough for coöperation with said conical formation to clamp the sections rigidly together, said ring being formed to interengage with a broaching machine head.

4. An apparatus of the kind described, comprising a sleeve arbor having a lengthwise extending angular guideway therethrough for a broach and slots at opposite sides of said guide way opening thereinto, a broach having a body angular in cross section to fit said guideway with oppositely extending ribs to fit said slots and be guided thereby, the body of the broach having bearing shoulders at either side of said ribs fitting slidably against backing portions of said arbor, and a line of cutting teeth tapering with relation to the direction of broach movement carried by one of said ribs.

5. An apparatus of the kind described, comprising a sleeve arbor having a lengthwise rectangular guide way therethrough for a broach and slots at opposite sides opening into said way, and a broach having a body portion rectangular in cross section to fit said way and opposite ribs to be guided by said slots, the body of the broach having bearing shoulders at either side of said ribs fitting slidably against backing portions of said arbor, said ribs having lines of cutting teeth formed thereon oppositely diverging with relation to the direction of broach movement and operable through a work holding portion of said sleeve arbor for cutting key ways in a work piece.

6. An apparatus of the kind described, comprising a sleeve arbor with a work holding portion at its front end, said arbor having a lengthwise extending angular guide way therethrough for a broach and slots extending oppositely from said way, and a broach having an angular body to fit said guide way and opposite ribs to be guided by said slots, the body of the broach having bearing shoulders at either side of said ribs fitting slidably against backing portions of said arbor, one of said ribs having a line of cutting teeth formed integral therewith, and the other of said ribs being of lesser width and having a bar with another line of cutting teeth removably fixed thereto, said lines of cutting teeth diverging oppositely from the line of broach movement.

In testimony whereof, I have signed my name to this specification, in the presence of two subscribing witnesses.

RALPH R. LAPOINTE.

Witnesses:
C. L. ROGERS,
R. G. HERSEY.